July 23, 1957  R. T. WHITNEY  2,800,370
SAFETY INTERLOCK APPARATUS FOR ANTI-WHEEL SLIDE EQUIPMENT
Filed April 28, 1954  2 Sheets-Sheet 2
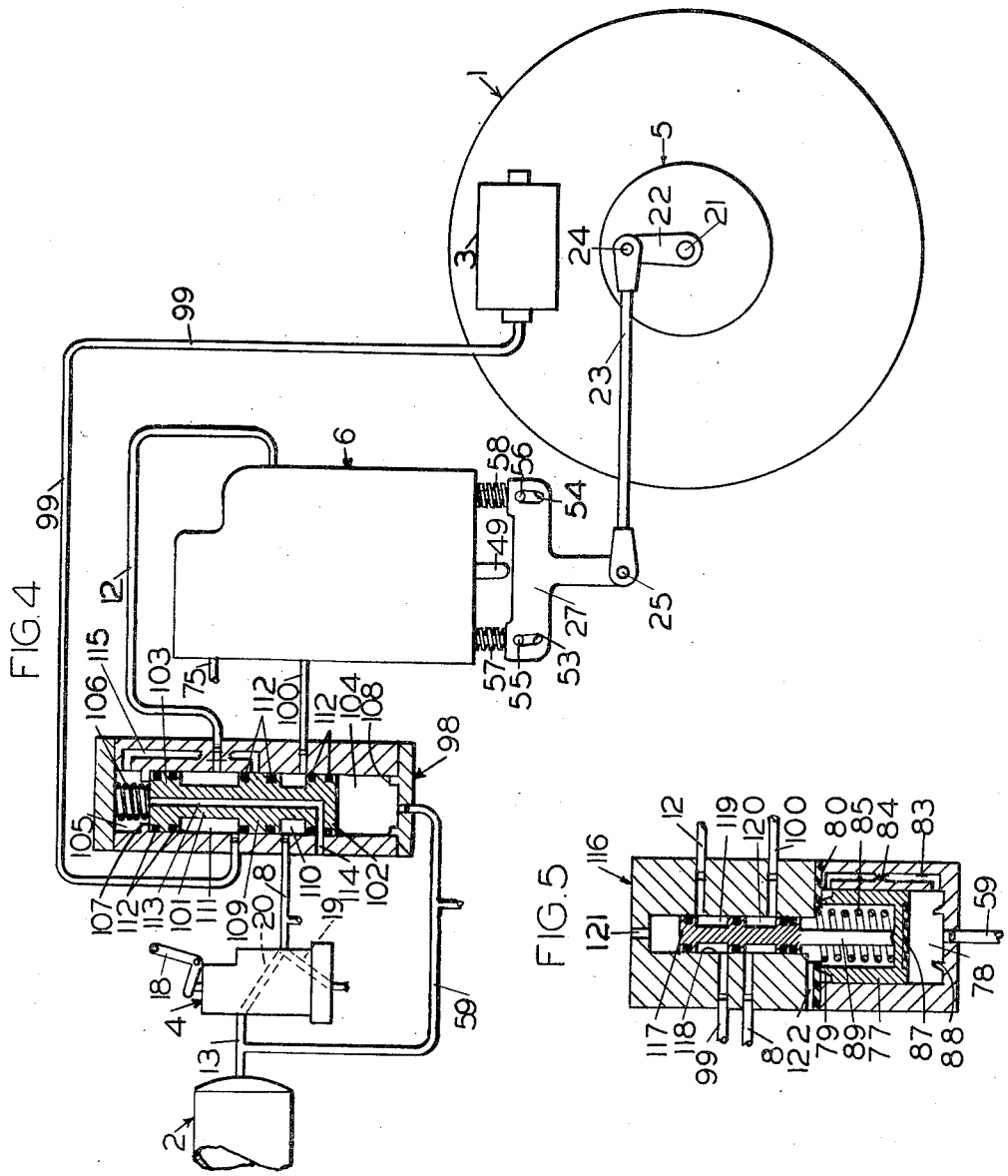
INVENTOR.
Ralph T. Whitney
BY
Adelbert O. Steinmiller
ATTORNEY

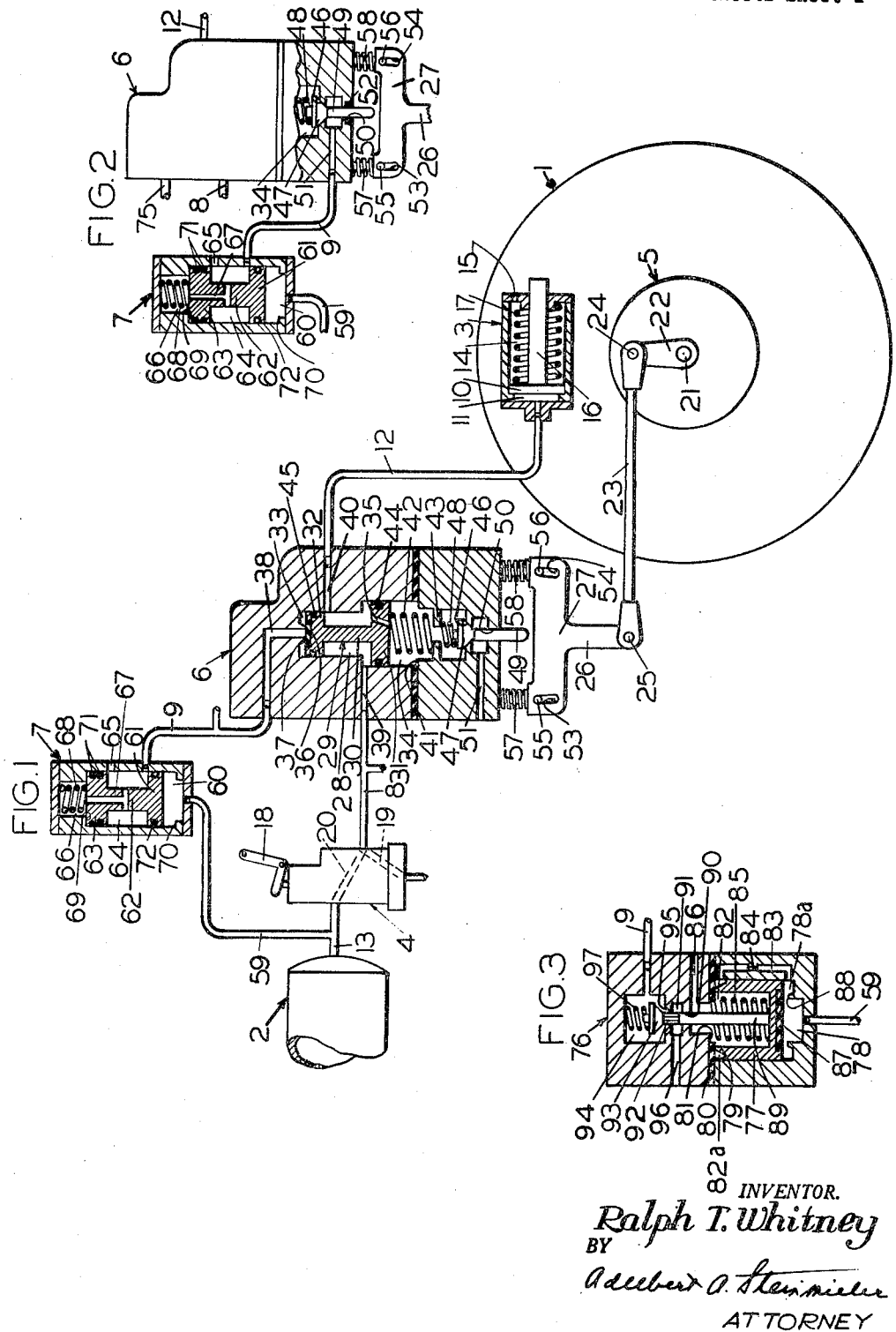

United States Patent Office 2,800,370
Patented July 23, 1957

2,800,370

SAFETY INTERLOCK APPARATUS FOR ANTI-WHEEL SLIDE EQUIPMENT

Ralph T. Whitney, Trafford, Pa., assignor to Westinghouse Air Brake Company, Wilmerding, Pa., a corporation of Pennsylvania Application April 28, 1954, Serial No. 426,153

7 Claims. (Cl. 303—21)

This invention relates to fluid pressure operable brake control apparatus and, more particularly to the type having means for preventing wheel-slide due to application of a braking force to the wheel in excess of the adhesion of the wheel tread to a runway or landing strip.

In fluid pressure operable brake control apparatus such as of the type employed on airplanes, anti-wheel-slide devices responsive to a slipping condition of a wheel and to termination of such slipping condition have been provided for automatically effecting a release and reapplication, respectively, of the braking force on the wheel by controlling release and supply, respectively, of fluid pressure from and to the brake application device associated with the wheel. The anti-wheel-slide device operates in repeated cycles, in the manner described, during the stopping distance of the airplane to thereby prevent locking and sliding of the wheels. As used herein, the term "slipping condition" refers to the condition existing during the short interval of possibly one or two seconds, in which the wheel decelerates at an excessively rapid rate toward a locked condition as the result of application of a braking force exceeding the adhesion of the wheel tread to the ground or roar surface. The term "sliding condition," as used herein, refers to the dragging of a wheel in a locked condition on the runway or ground.

With an anti-wheel-slide device operating as above described, it is possible that, due to some abnormal or slippery runway condition, said anti-wheel-slide device may have to operate with such frequency that the pressure of fluid in the fluid pressure supply reservoir may be depleted so rapidly that the compressor supply fluid pressure to said reservoir cannot maintain adequate pressure therein to insure an adequate degree of braking effort on the wheels for eventual, safe stopping of an airplane, even though the volume of said reservoir otherwise is adequate for all normal braking operations.

One object of the invention, therefore, is the provision of novel means for preventing pressure of fluid in the supply reservoir of fluid pressure brake equipment, such as employed on airplanes, from being depleted or reduced by operation of an anti-wheel-slide device below a degree which would still provide adequate braking of the airplane to assure safe stopping thereof.

Another object of the invention is the provision of such novel means which is relatively simple and inexpensive and which in no way changes or has any adverse effect upon the usual mechanical operation of the anti-wheel-slide portion of the brake equipment.

Other objects and advantages of the invention will appear in the following more detailed description thereof when read in conjunction with the accompanying drawings, wherein:

Fig. 1 is a diagrammatic view, partly in section and partly in outline, of a brake control apparatus embodying one form of the invention;

Fig. 2 is a diagrammatic view of a portion of the brake control apparatus shown in Fig. 1 but embodying another form of the invention;

Fig. 3 is a diagrammatic view, in section, of a modification of the embodiments of the invention shown in Figs. 1 and 2;

Fig. 4 is a diagrammatic view, partly in section and partly in outline of a brake control apparatus embodying a still further form of the invention, and, Fig. 5 is a diagrammatic view of a modification of the embodiment of the invention shown in Fig. 4.

*Description—Figs. 1, 2 and 3*

For purposes of illustration, the invention will hereinafter be described as applied to airplane brake control apparatus, but it should be understood that it is not intended to be so limited.

Referring to Fig. 1 of the drawing, the reference numeral 1 designates an airplane wheel, the braking of which is adapted to be controlled by a fluid pressure brake control apparatus comprising a fluid pressure supply reservoir 2, which is adapted to be charged by a compressor or other suitable means (not shown) with fluid under pressure for use to brake said wheel, a brake application or cylinder device 3 adapted to be operated by fluid under pressure to brake said wheel, a manually operable brake control valve device 4, a wheel-slip responsive control device 5, a release valve device 6, and, according to the invention, a safety interlock device 7.

While, for purposes of illustration, only one landing wheel of an airplane is shown, it should be understood that each of the wheels desired to be braked will be similarly equipped with a wheel-slip responsive control device, and a release valve device which will be connected in parallel with the release valve device 6 for wheel 1 to the control valve device 4 and safety device 7 via branches of pipes 8 and 9, respectively.

The wheel brake application device 3 is adapted to be arranged in conventional manner for operation by fluid under pressure to apply braking force to the wheel 1, and for purposes of illustration, comprises a casing containing a piston 10 at one side of which there is a pressure chamber 11 open to a pipe 12 connected to the release valve device 6. Chamber 11 may be connected to the reservoir 2 through the release valve device 6 and the control valve device 4 by way of a conduit comprising pipes 12 and 8 and a pipe 13 connecting said reservoir to the control valve device 4. At the opposite side of the piston 10 there is a non-pressure chamber 14 open to atmosphere through a vent 15 in the casing. The piston 10 has a piston rod 16 extending through chamber 14 to the exterior of the casing and adapted for actuating the brake shoes or brake elements (not shown) to exert a braking effect on wheel 1 by suitable means not shown. The piston 10 and the piston rod 16 are adapted to be moved in the direction of the right hand, as viewed in the drawing, by fluid pressure in chamber 11 to a brake-applying position in which a braking force is applied to wheel 1. Upon relief of fluid pressure in chamber 11, a spring 17 provided in chamber 14 acts on piston 10 to move said piston and the piston rod 16 back to a normal position, in which they are shown in the drawing, and in which the braking force on wheel 1 is released.

The brake control valve device 4, which is interposed between pipes 13 and 8, is of the usual self-lapping type adapted to be manually operated by moving a handle 18 in a counterclockwise direction, as viewed in the drawing, from a brake release position, in which pipe 8 is disconnected from pipe 13 and open to atmosphere by way of an exhaust indicated schematically by dashed lines 19, to a brake application position, in which said pipes are connected by way of a passageway, indicated schematically by dashed lines 20, to supply fluid from reservoir 2 to said pipe 8 at a pressure proportional to the extent that said handle is moved out of its brake release position.

The wheel-slip responsive control device 5, which is shown in outline in the drawing, may be of any suitable type, but preferably is a rotary type, such as that disclosed, for example, in U. S. Patent No. 2,573,387, issued to Rankin J. Bush on October 30, 1951, including a housing adapted to be coaxially and removably mounted to the wheel 1 for rotation therewith. While not deemed essential to an understanding of the invention and, therefore, not shown in the drawing, the housing of the control device 5 contains a relatively rotatable inertia mass connected through clutch means and a cluster of planetary gears to an operating shaft 21 in such a manner that when rotation of said inertia mass is in synchronization with the rotation of the wheel 1, or what may be called a normal rotating position occupied when said wheel is not slipping on a runway, no angular rotation of said operating shaft occurs. But when the wheel 1 is decelerating in response to a slip on a runway or is accelerating to ground speed immediately following touchdown or recovery from a slip, the inertia mass will either overrun or lag behind, respectively, said wheel to effect limited angular rotation of the shaft 21 in either a counterclockwise or a clockwise direction, respectively, as viewed in the drawing. Limited angular rotation of the shaft 21 will produce corresponding limited angular displacement of a rocker arm 22 which has one end rigidly connected to the operating shaft 21 and the other end pivotally connected to one end of a link rod 23 by means of a pin 24. The other end of the link rod 23 is pivotally connected by means of a pin 25 to the lower end of a depending arm 26 of a T-shaped operating lever 27 of the release valve device 6.

The release valve device 6 is interposed between pipes 8 and 12 for controlling communication therebetween and thereby between the brake application device 3 and the reservoir 2 by way of said pipes, the control valve device 4 and pipe 13. The release valve device 6 comprises a casing containing a spool-shaped valve member 29. The valve member 29 comprises an axial connecting portion 30 contained in a chamber 28 and having integrally formed therewith at one end a piston 31 and at the opposite end a valve 32. The valve 32 cooperates with the casing to define at the side of said valve opposite chamber 28 a chamber 33, while the piston 31 cooperates with said casing to define at the side of said piston opposite chamber 28 a control chamber 34 which is open to chamber 28 by way of a restricted passageway 35 extending through and opening to both sides of said piston. The valve 32 is provided on the side adjacent chamber 33 with a sealing gasket 36 adapted for making sealing engagement with a seat rib 37 to close off chamber 33 from a passageway 38 in the casing connected to pipe 9, when the valve member 29 is in a normal or fluid pressure supply position, in which position it is shown in the drawing and in which communication between pipes 8 and 12 is established through chamber 28 by way of two passageways 39 and 40 in the casing opening to chamber 28 and connected to pipes 8 and 12, respectively. The valve member 29 is slidable in the casing from its supply position to a release position, defined by engagement of the piston 31 with a shoulder 41 formed in the casing in chamber 34, in which position communication between pipes 8 and 12 is disestablished and communication between pipes 9 and 12 is established through chamber 33 by way of passageways 38 and 40. A spring 42, disposed in chamber 34 and having one end bearing against the piston 31 and the opposite end bearing against an annular shoulder 43 formed in the casing, is adapted for urging the valve member 29 toward its fluid pressure supply position. Piston 31 and the smaller area valve 32, both of which are slidable in the casing, are provided with sealing O-rings 44 and 45, respectively, to prevent leakage of fluid under pressure past said piston and said valve.

Chamber 34 of the release valve device 6 is provided at its base, opposite piston 31, with an annular valve seat 46 on which a valve 47 is adapted to be normally seated. The valve 47 is biased toward its normal or closed position, in which it is shown in the drawing, by a spring 48 disposed in chamber 34, and has associated therewith a valve stem 49 slidably operable in and extending through a bore 50 to the exterior of the casing. The side of the valve 47 opposite chamber 34 is vented to atmosphere by a passageway or vent 51 in the casing to permit venting of chamber 34 to atmosphere when said valve is unseated, as will hereinafter be described.

The valve stem 49, extending through bore 50 to the exterior of the casing, is arranged to have its extending end engaged by the T-shaped operating lever 27 at the junction of two oppositely extending arms of said lever. The two oppositely extending arms of lever 27 have near their respective outer ends two slightly, inwardly curved slots 53 and 54 through which two pins 55 and 56, respectively, secured to the casing, extend. Two like springs 57 and 58, under compression, are interposed between the casing of the device and the opposite ends of the two oppositely extending arms, respectively, of the operating lever 27 to bias said lever to a central, normal position in which said lever disengages the end of valve stem 49. The lever 27, in response to the limited angular displacement of the rocker arm 22 of the device 5 translated through the link rod 23, is pivotable about either of the pins 55 or 56 to engage and move upwardly the valve stem 49 to unseat the valve 47 whereby chamber 34 is vented to atmosphere by way of the vent 51.

The safety interlock device 7, shown in Fig. 1, is interposed between pipes 9 and 59, the latter pipe being directly open to pressure of fluid in reservoir 2 by way of pipe 13 and connected to a pressure chamber 60 of said interlock device. The safety device 7 comprises a casing containing a reciprocably operable spool-shaped piston valve member having at one end, adjacent chamber 60, and subject on one face to the fluid pressure therein, a piston 61 integrally connected by a connecting portion 62 to a piston or valve 63 at the opposite end. The piston 61 and valve 63 cooperate with the casing to define intermediate thereof a chamber 64 constantly open to passage 38 in the release valve device 6 by way of pipe 9 and normally open to atmosphere by way of a vent 65 in said casing. The valve 63 further cooperates with the casing to define at the side of said valve opposite chamber 64 a chamber 66 in constant communication with chamber 64 by way of a passageway 67 in the piston valve member. A spring 68 is disposed in chamber 66 and acts on the piston valve member in opposition to the pressure of fluid acting on the piston 61 in chamber 60. The value of spring 68 is such that, as long as the pressure of fluid in reservoir 2, and consequently in chamber 60, remains above a certain degree, considered somewhat in excess of that for safely braking a vehicle, said spring will yield to the opposing force of fluid pressure in chamber 60 to permit said piston valve member to be maintained in a normal position, in which it is shown in the drawing, defined by engagement of the valve 63 with a soulder 69 formed in the casing in chamber 66, and in which position chamber 64 and consequently chamber 66 (by way of passageway 67) are vented to atmosphere by way of vent 65. When the fluid pressure in reservoir 2, and consequently in chamber 60, is depleted to a degree slightly below the above-mentioned certain degree, the force of spring 68 will overcome the opposing force of fluid pressure in chamber 60 and move the piston valve member to a low pressure or cut-out position, defined by engagement of the piston 61 with a shoulder 70 formed in the casing in chamber 60, in which position the valve 63 will be in a lap position to close off the vent 65 and thereby close off chambers 64 and 66 to atmosphere. Two annular sealing O-rings 71 and one O-ring 72 are provided on valve 63 and piston 61, respectively, to prevent leakage of fluid under pressure past said valve and said piston.

If desired, the pipe 9 connected to chamber 64 in the interlock device 7 may be connected to passage 51 in the release valve device 6, as shown in Fig. 2 of the drawings, instead of being connected to passage 38 as shown in Fig. 1. When pipe 9 is thus connected to passage 51, passage 38 in the release valve device 6 will be open to atmosphere via pipe 75, and a ring seal 52 will be provided in the casing of said device to have sealing and sliding contact with the valve stem 49 to prevent leakage of fluid along said stem from the chamber connected to passage 51.

Moreover, a snap-acting device 76, shown in Fig. 3 of the drawings, may be substituted for the safety interlock device 7 in either the apparatus shown in Fig. 1 or that shown in Fig. 2 of the drawings.

The device 76 comprises a casing in which there is slidably mounted a cup-like reciprocating valve or piston member 77, the closed outer end of which carries a sealing valve 87 adapted to cooperate with a seat rib 88 on said casing to close communication between a chamber 78 within said rib and open to pipe 59, and a chamber 78a encircling said rib. The opposite, open end of the valve member 77 is provided with an annular seat rib 79 adapted to seat on a sealing gasket 80 mounted on a shoulder 81 formed in said casing, to close communication between a chamber 82 encircled by said rib and a chamber 82a encircling said rib and connected to chamber 78a through a passageway 83 having a choke 84. A spring 85, disposed in chamber 82, which is constantly open to atmosphere by a passageway 86, acts on the valve member 77 for moving same out of a normal position, in which it is shown in the drawing, defined by engagement of the seat rib 79 with the gasket 80, to a low pressure position defined by engagement of a valve 87, carried by the valve member 77, with a seat rib 88 formed on the casing. The value of the spring 85 is such that it will overcome the opposing force of fluid pressure in chambers 78, 78a acting on the lower side of valve member 77 and move seat rib 79 in said valve member out of contact with gasket 80 when the pressure of such fluid is reduced to a chosen degree somewhat in excess of that required for safe braking of the airplane. Upon unseating of the seat rib 79 from gasket 80 fluid under pressure from chambers 78, 78a will suddenly flow through passageway 83 into chambers 82, 82a and acting in the upper side of valve member 77 will provide a force which acting with spring 85 will promptly move said valve member with a snap action to its low pressure position against force of fluid pressure in chamber 78. In this low pressure position chamber 78a is vented to chamber 82a by way of passageway 83, and both said chambers are vented to atmosphere via passage 86, valve 87 of valve member 77 being subject to pressure of fluid from reservoir 2 only over the area within the seat rib 88. The seat rib 88 is preferably of smaller diameter than the seat rib 79, which, therefore, will necessitate a build-up of fluid pressure in reservoir 2 and hence in chamber 78 to a degree higher than the above-mentioned chosen degree before the fluid pressure acting on the area of valve 87 enclosed by the seat rib 88 is sufficient to overcome the opposing force of spring 85. When such higher pressure is obtained in reservoir 2 and hence in chamber 78, the valve 87 will be unseated from the seat rib 88 against spring 85 so that such fluid pressure will then become effective over the entire area of valve 87 to effect prompt or snap movement of valve 87, and consequently valve member 77, against opposing force of spring 85, to its normal position into seating engagement with gasket 80, the choke 84 acting to so restrict the flow of fluid pressure to chamber 82 opposite valve 87 as to assure a sufficient differential of pressure to effect prompt movement of valve member 77 to its normal position.

Within chamber 82 the valve member 77 is engaged by one end of a rod 89 projecting through a guiding bore 90 in the casing into a chamber 91 wherein the other end of said rod abuts the end of a fluted valve stem 92 associated with a valve 93 disposed in a chamber 94 open to pipe 9. The rod 89 is adapted to move with the valve member 77 and to engage the valve stem 92 and thereby unseat the valve 93 from a valve seat 95 formed in a wall of chamber 94 when said valve member is moved to its normal position. With the valve 93 in its unseated position, pipe 9 is vented through chamber 94, past the fluted stem 92, through chamber 91 and a passageway 96 leading from chamber 91 to atmosphere. When the valve member 77 is moved to its low pressure position, the rod 89 will disengage the valve stem 92, and a spring 97, disposed in chamber 94, will seat the valve 93 on seat 95, thereby closing off pipe 9 to atmosphere.

Operation—Figs. 1, 2 and 3

Referring first to Fig. 1, let it be assumed that the reservoir 2 is charged with fluid at a normal pressure, i. e., in a range in excess of that required for safe braking of the airplane and that incident to such pressure in chamber 60 of the interlock device 7 the parts thereof are in the position in which they are shown in the drawing opening pipe 9 to atmosphere via passage 65. Further assume that the parts of control device 4 and release valve device 6 are in their normal positions, in which they are shown in the drawing, whereby chamber 11 of the brake cylinder device 3 is open to atmosphere and the brakes on the airplane are therefore released.

Let is further be assumed that the wheel 1 of the airplane, in landing, has just made contact with the runway. A short interval of time, such as several seconds, after touchdown of the wheel 1, the pilot of the airplane may operate the handle 18 of the brake control device 4 to a brake application position, thereby opening communication between pipes 13 and 8 through passageway 20 permitting fluid under pressure to be supplied from the reservoir 2 to chamber 28 of the release valve device 6 and hence to chamber 34 through restricted passageway 35. Passageway 35 restricts the flow of fluid under pressure to chamber 34 which is vented to atmosphere as presently to be described. As a result, a predominating fluid pressure differential is created on the side of piston 31 adjacent chamber 28 sufficient to overcome the opposing force of spring 42 and cause movement of valve member 29 to its release position. In this position of the valve member 29, communication between chamber 28 and chamber 11 of the brake application device 3, through pipe 12, is cut off and said chamber 11 is vented to atmosphere by way of a fluid pressure release communication comprising pipe 12, chamber 33 of the release valve device 6, pipe 9, chamber 64 of the safety interlock device 7 and vent 65.

Immediately upon touch down, the wheel 1 will have started to accelerate and overrun the rotary inertia mass contained in the wheel-slip responsive device 5, and angular movement of the operating shaft 21 and the rocker arm 22 out of normal position, as in a clockwise direction as viewed in the drawing, will have been correspondingly effected. The lever 27 of the release valve device 6 will thus accordingly have rocked about the pin 55 in a counterclockwise direction, as viewed in the drawing, against the opposing force of spring 58. As a result, lever 27 will have engaged and moved the valve stem 49 upwardly and unseated valve 47, thereby venting chamber 34 to atmosphere through the vent 51 slightly before the fluid under pressure is supplied to chamber 28 by operation of the brake control device 4 by the operator.

After the wheel 1 has accelerated to substantially ground speed, the inertia mass in the control device 5 will obtain a corresponding speed, and the spring 58 of the release valve device 6 will return lever 27 to its normal position out of contact with valve steam 49. The valve 47 will then be reseated by the spring 48 whereupon the pressures in chambers 28 and 34 will equalize rapidly through passageway 35, and spring 42 will return the valve member 29 to its normal position, thereby reestablishing communication between chamber 28 and chamber 11 of the brake application device 3 whereupon fluid pressure will flow to the latter chamber and actuate piston 10 and piston rod 16 to cause a braking effect to be exerted on wheel 1 to decelerate and stop the airplane.

If the retarding force or degree of braking thus applied to wheel 1 exceeds the adhesion of said wheel to the runway, as in case of an uneven or slippery condition of the runway, said wheel may start to slip and decelerate so rapidly relative to the rotary inertia mass in the control device 5 that said inertia mass will overrun the wheel 1 and cause angular displacement of the shaft 21 and rocker arm 22 in a counterclockwise direction, as viewed in the drawing. The lever 27 will thereby be rocked about the pin 56 in a clockwise direction, as viewed in the drawing, against the opposing force of spring 57 to engage the valve stem 49 and unseat valve 47 and thereby release fluid pressure in chamber 34 to atmosphere to permit the pressure of fluid in chamber 28 to move valve member 29 to its brake release position in which chamber 11 of the brake application device 3 will be disconnected from chamber 28 and vented to atmosphere past the unseated valve 32, through pipe 9, chamber 64 in the interlock device 7 and port 65 thereby releasing the braking effect on wheel 1. Upon release of this braking effect, the wheel 1 will promptly accelerate back to ground speed of the vehicle and, in the manner above described, when said wheel and the rotary inertia mass in the control device 5 are again rotating in synchronization, the braking effect will automatically be reapplied to said wheel. If the wheel 1 against starts to slip before the vehicle is brought to a stop, the braking effect thereon will again be released and, upon cessation of wheel-slip, reapplied in the manner above described, until eventually the vehicle comes to a stop, it being noted that actual locking and sliding of the wheel is positively prevented during stopping of the airplane.

The above described automatic control of the brakes may necessitate operation of the brake control apparatus through a series of brake application and release cycles so frequently and rapidly that the fluid pressure in reservoir 2 may be reduced too rapidly to permit the compressor (not shown) to maintain sufficient fluid pressure in said reservoir to insure safe stopping of the airplane. According to the invention, however, the interlock device 7 is provided to operate to prevent release of fluid under pressure from chamber 11 of the brake cylinder device by operation of the wheel-slip responsive device 5 and release valve device 6 before the pressure in reservoir 2 becomes thus reduced to a degree where safe braking of the airplane would not be obtained.

Assuming that the pressure of fluid in reservoir 2 has been depleted, through use, to a degree below which safe braking of the airplane could not be obtained, the fluid pressure in chamber 60 of the safety device 7 also will have been correspondingly reduced. When this reduced pressure of fluid in chamber 60 is obtained, the spring 68 will move the piston-valve member 61—63 to its low pressure position, thereby closing off vent 65 to atmosphere. The spring 68 will then maintain the piston-valve member in its low pressure position as long as the pressure of fluid in reservoir 2 and consequently in chamber 60, remains below the pressure degree just defined.

Assuming that, during such time that the piston-valve member of the device 7 is in its low-pressure position, the wheel 1 again slips, the control device 5 will operate in the usual manner above described to effect unseating of the valve 47 of the release valve device 6, thereby venting chamber 34 of said release valve device to atmosphere to permit fluid pressure in chamber 28 to operate the valve member 29 to its release position, as above described. With the valve member 29 in its release position, pipes 9 and 12 will be in comunication through chamber 33, but the fluid pressure in chamber 11 of the brake application device 3 can not be vented to atmosphere by way of chamber 64 and vent 65 of the safety device 7, because vent 65 is closed to atmosphere, as above noted, and the braking effect on wheel 1 can not therefore automatically be released. In order to effect a brake release to terminate the wheel-slip under this condition, the pilot must manually operate the handle 18 of the control valve device 4 to its brake release position sufficiently to relieve chamber 28 of the release valve device 6 of fluid pressure by way of pipe 8 and exhaust 19 of said device 4. When fluid pressure is relieved from chamber 28, the spring 42 will actuate the valve member 29 to its fluid pressure supply position, and the fluid pressure in chamber 11 of the brake application device 3 will then be released by way of a communication comprising pipe 12, chamber 28 of the release valve device 6, pipe 8 and exhaust 19 of the control device 4.

Thus, it will be noted that as long as the piston-valve member of the safety device 7 remains in its low pressure position, application and release of brakes on wheel 1 must be controlled manually by the control valve device 4. Such manual control of the brakes will permit the pilot to conserve the fluid pressure in reservoir 2 until such pressure has been restored to a degree which acting on piston 61 of the interlock device will restore the parts thereof to normal position to again permit automatic control of brakes by the wheel-slip control device 5.

When the pressure of fluid in reservoir 2, and consequently in chamber 60 of the safety device 7, has been restored sufficiently, such pressure acting in chamber 60 will overcome the opposing force of spring 68 to operate the piston-valve member to its normal position, thereby permitting the brake control apparatus to revert to automatic control of the brakes, as above described.

There may be some objection to the arrangement as shown in Fig. 1 in that, during such time that the piston-valve member of the safety device 7 is in its low pressure position, in which fluid pressure from chamber 11 of the brake application device 3 cannot be automatically vented to atmosphere, there may be a certain loss of fluid pressure from reservoir 2. This loss of fluid pressure will occur by way of pipe 13, control valve device 4, pipe 8, chamber 28, passageway 35, chamber 34 past valve 47 and out vent 51 each time the control device 5 effects unseating of the valve 47 while the control valve device 4 is in its brake application position supplying fluid under pressure to chamber 28. From a practical standpoint this slight loss of pressure from reservoir 2 would not be objectionable but it may be prevented by the arrangement of the safety device 7, as shown in Fig. 2, wherein the interlock device 7, via pipe 9, controls the communication through which fluid released by the valve 47 normally flows atmosphere, as will be readily apparent without further description.

The safety interlock device 76, shown in Fig. 3 of the drawing, may be employed in the apparatus shown in Figs. 1 and 2 of the drawings instead of the interlock valve device 7, the valve 93 in the safety device 76 being adapted to perform the same function as the piston valve 63 in the interlock device 7, i. e., in controlling communication between pipe 9 and atmosphere.

In operation, when pressure of fluid in the reservoir 2 is in the range above the chosen pressure above defined at which the piston 61 and valve 63 of the safety device 7 are in their normal or upper position, such pressure acting on the lower face of the valve piston 77 will hold same in the position in which it is shown in the drawing unseating valve 93 and thereby opening pipe 9 to atmosphere. If the pressure in reservoir 2 becomes reduced, however, to the above defined chosen pressure, spring 85 will unseat the valve piston 77 from gasket 80 whereupon, as above described, said valve piston will snap to its lower low pressure seated position permitting seating of valve 97 whereby further depletion of pressure in reservoir 2 will be prevented by automatic operation of the wheel-slip control device 5. When the pressure of fluid in the reservoir is then increased sufficiently to unseat valve piston 77 from the seat rib 88, said valve piston will snap to its upper position, as heretofore described, to reopen valve 93 and permit automatic control of the brakes on the airplane by the wheel-slip control device 5 in the same manner as heretofore described.

In the various embodiments of the invention so far described it is to be noted that when the safety interlock valve device 7 or 76 is in its low pressure position, the wheel-slip control device 5, lever 26 and valve 47 will operate the same as when said device is in normal position, although without effect upon braking of the airplane.

Description—Figs. 4 and 5

The brake control apparatus, as shown in Fig. 4, comprises the reservoir 2, the brake application device 3 for effecting application and release of braking force to the wheel 1, the pilot's brake control valve device 4, the wheel-slip responsive device 5, the release valve device 6 and, according to the invention, a safety interlock device 98, differing in structure and disposition from the safety interlock devices 7 and 76.

Pipe 8 leading from the control valve device 4 is connected to the safety device 98 instead of the release valve device 6, and pipe 12 normally open to chamber 28 of the release valve device 6 through passageway 40 is also connected to the safety device 98 instead of to the brake application device 3, as in Fig. 1. The brake application device 3 is connected to the safety device 98 by a pipe 99, while a pipe 100 open to chamber 28 of the release valve device 6 through passageway 39 is also connected to the safety device 98.

The safety interlock device 98 comprises a casing which is bored to slidably receive a spool-type piston valve member 101 comprising at its opposite ends pistons 102 and 103 cooperative with said casing to define at their outer faces chambers 104 and 105, respectively, chamber 104 being open to pipe 59 and, therefore, fluid pressure in reservoir 2. Consequently piston 102 is subject to the pressure of fluid in reservoir 2, while a spring 106, disposed in chamber 105 and acting on piston 103, opposes such pressure acting on said piston 102. The value of spring 106 is such that when the pressure of fluid in reservoir 2, and consequently in chamber 104, becomes reduced to a chosen degree somewhat in excess of that necessary to provide safe braking of the airplane, said spring will move the piston member 101 out of a normal position defined by engagement of piston 103 with an annular shoulder 107 formed on the casing in chamber 105, in which position said piston member is shown, to a low pressure position defined by engagement of said piston member with an anular shoulder 108 formed on said casing in chamber 104.

The piston member 101 is provided, intermediate the pistons 102 and 103, with a land or piston valve 109, of the same diameter as said pistons, having sliding contact with the bore surface of the casing. The land 109 cooperates with the casing and piston 102 to define a chamber 110 through which communication is established between pipes 8 and 100 when the piston member 101 is in its normal position, and said land cooperates with the said casing and piston 103 to define a chamber 111 through which communication between pipes 12 and 99 is established when said piston member is in said normal position. The pistons 102 and 103 and the land 109 are each provided with suitable sealing rings 112 having sealing and sliding contact with the bore surface of the casing to prevent leakage of fluid under pressure past said pistons and said land. Chamber 105 is normally vented to atmosphere through a passageway 113 opening to said chamber and extending through the piston member 101 and opening to the peripheral surface of the piston 102 to register with a vent 114 located in the casing at a point where said registration is effected when said piston member is in its normal position. One end of a passageway 115 formed in the casing is open to chamber 105, the other end opening to the bore surface of said casing at a point which is lapped by the land 109 when the piston member 101 is in its normal position.

The land 109 is axially located intermediate the pistons 102 and 103, and said pistons are axially spaced apart relative to each other so that, upon movement of piston member 101 to its low pressure position, the openings of pipes 12 and 100 into the device 98 are lapped by piston 103 and land 109, respectively, to disestablish communication between pipes 12 and 99 and between pipes 8 and 100, respectively, vent 114 is lapped by land 109, passageway 115 is open to chamber 111 to permit communication between chambers 105 and 111, and communication between pipes 8 and 99 is established through chamber 111.

Another version of a safety interlock device is shown in Fig. 5 and is designated by the numeral 116. The safety device 116 functions similarly to the safety device 98, except that it is provided with the valve member 77, as is the safety device 76 in Fig. 3, having differential pressure areas on opposite sides thereof to effect positive, snap action of a spool-type valve member 117 axially attached to the follower rod 89. The valve member 117 is slidably operable, by the valve member 77 through the follower rod 89, in a bore 118 in the upper portion of the casing into which bore the pipes 8, 12, 99 and 100 open. The valve member 117 is provided with two annular grooves which cooperate with the wall of bore 118 to define two annular chambers 119 and 120, respectively. These annular grooves are axially spaced apart on the valve member 117 so that communication between pipes 12 and 99 is established through chamber 119, and communication between pipes 8 and 100 is established through chamber 120 when the valve member 77, and consequently the valve member 117, is in its normal position above described. Upon movement of the valve member 77 to its low pressure position, in the manner above described, the valve member 117 is correspondingly moved out of its normal position to a by-pass position in which communication between pipes 12 and 99 and communication between pipes 8 and 100 are disestablished, while a communication between pipes 8 and 99 is established through chamber 119. Vents 121 and 122 are provided in the casing for venting the upper and lower sides, respectively, of the valve member 117.

Operation—Figs. 4 and 5

In operation of the brake control apparatus, as shown in Figs. 4 and 5, it should be borne in mind that the brake application device 3, the brake control valve device 4, the wheel-slip responsive device 5 and the release valve device 6 all function in similar manner as the corresponding devices shown in Fig. 1.

Referring to Fig. 4, assuming that reservoir 2 is charged with fluid at a pressure in excess of that at which it is desired to prevent release of fluid under pressure from the brake application device 3 by operation of the wheel-slip responsive device, and that the devices are all in their normal position, in which they are shown, the pilot, upon landing, will operate the handle 18 of the control valve device 4 to a brake application position, thereby permitting fluid pressure to be supplied from reservoir 2 to the brake application device 3 through pipe 13, passageway 20, pipe 8, chamber 110 of the safety device 98, pipe 100, through chamber 28 of the release valve device 6, pipe 12, chamber 111 of said safety device and pipe 99 to effect a brake application. During normal operation of the brake control apparatus, should a wheel-slip occur, said brake control apparatus will operate in a similar manner as the brake control apparatus shown in Fig. 1 to automatically release the brake application and, upon termination of the wheel-slip, to automatically reapply the brakes, except that upon release of the brakes, the fluid pressure in chamber 11 of the brake application device 3 will be exhausted through a fluid pressure release communication comprising pipe 99, chamber 111 of the safety device 98, pipe 12, chamber 33 of the release valve device 6 and exhaust 75.

Assuming now that the pressure of fluid in reservoir 2 and, therefore, in chamber 104 of the safety device 98 becomes depleted to a degree at which any further reduction might jeopardize safe stopping of the airplane, the spring 106 will actuate the piston member 101 to its low pressure position, as above described, thereby permitting the supply of fluid pressure from the reservoir 2 to the brake application device 3 to by-pass the release valve device 6 by establishing direct communication between pipes 8 and 99 through chamber 111 of said safety device. Chamber 105 of the safety device 98 will then be subject to the same fluid pressure as chamber 111 by virtue of the communication therebetween through passageway 115. The spring 106, as hereinafter noted, will maintain the piston member 101 in its low pressure position as long as the fluid pressure in chamber 104 remains below the degree above defined. With the piston member 101 in its low pressure position, the pilot may manually control the application and release of the brakes by manipulation of the handle 18 of the brake control valve device 4, thereby conserving the fluid pressure in reservoir 2 until it has been restored to a degree above that above defined, at which time the pressure of such fluid in chamber 104 will overcome the opposing force of spring 106 to move the piston member 101 back to its normal position. When the piston member 101 has been moved back to its normal position, the brake control apparatus will again operate automatically, as previously described, to release and apply the brakes.

The safety device 116 shown in Fig. 5 functions similarly to the safety device 98, except that the valve member 77, characterized by differential pressure areas, is employed to actuate the valve member 117 with a snap action. The valve member 117 performs the same function, in the same manner, as the piston member 101 of the safety device 98, and it is believed, therefore, that a detailed description of such operation is not essential to an understanding of the invention.

*Summary*

From the above description it will now be seen that I have provided, for use with a fluid pressure operable brake control apparatus of the type characterized by anti-wheel-slide means for automatically effecting release and reapplication of braking effect on a wheel in response to slipping and cessation of slipping of said wheel, respectively, to prevent locking or sliding of said wheel on the runway, means for automatically preventing depletion of fluid pressure available for brake application below a certain operating value at which such fluid pressure would be insufficient for safely stopping the airplane, and which last mentioned means, when operative to conserve the fluid pressure in reservoir 2, in no way changes or has any effect upon operation of the anti-wheel-slide means, but merely renders the operation of said anti-wheel-slide means ineffective to control the brakes during such time.

Having now described the invention, what I claim as new and desire to secure by Letters Patent, is:

1. In a vehicle brake control apparatus, the combination of a brake application device responsive to pressure of fluid for effecting a brake application to a vehicle wheel and to relief of such fluid pressure for releasing said brake application, a source of fluid under pressure, the pressure of which is adapted to be normally maintained in excess of a certain degree considered adequate for safely braking the vehicle, valve means manually and selectively operable to brake application and release positions in which fluid under pressure may be supplied from said source to and released from, respectively, said brake application device, a release valve device including a valve member having a normal position in which fluid under pressure may be supplied from said source to said brake application device, when said manually operable valve means is in its brake application position, and operable to a brake release position in which said brake application device is relieved of fluid pressure, independently of said manually operable valve means, by way of a fluid pressure release communication normally open to atmosphere, a wheel-slip control device responsive to a slipping condition of said wheel for effecting operation of said valve member to its brake release position and responsive to cessation of said slipping condition for effecting operation of said valve member to its normal position, and a safety device responsive to a reduction in pressure of fluid at said source to said certain degree to effect closing of said fluid pressure release communication to relief of fluid pressure only as effected by said release valve device, said release valve device comprising a casing, said valve member in said casing having a normal position for opening the brake application device to said source of fluid under pressure and for closing said release communication and having a brake release position for closing off said brake application device from said source and for opening said release communication, a piston connected to said valve member and operative to move same to its normal position in response to fluid pressure in a control chamber and to its brake release position upon relief of fluid pressure from said control chamber, and valve means operable by the wheel slip control device, in response to a slipping condition of the wheel and cessation of said slipping condition, to effect venting and closing, respectively, of said control chamber to atmosphere through a passageway in said casing, and said safety device comprising a valve controlling communication through said passageway, a piston connected to said valve and constantly subject on one side to and adapted to be operated by pressure of fluid at said source, when in excess of the certain degree, for operating said valve to one position for opening communication through said passageway, and spring means for actuating said piston and valve, upon reduction of the pressure of fluid at said source to said certain degree, to another position to close said communication.

2. In a vehicle brake control apparatus, the combination of a brake application device responsive to pressure of fluid for effecting a brake application to a vehicle wheel and to relief of such fluid pressure for releasing said brake application, a source of fluid under pressure, the pressure of which is adapted to be normally maintained in excess of a certain degree considered adequate for safely braking the vehicle, valve means manually and selectively operable to brake application and release positions in which fluid under pressure may be supplied from said source to and released from, respectively, said brake application device, a release valve device including a valve member having a normal position in which fluid under pressure may be supplied from said source to said brake application device, when said manually operable valve means is in its brake application position, and operable to a brake release position in which said brake application device is relieved of fluid pressure, independently of said manually operable valve means, by way of a fluid pressure release communication normally open to atmosphere, a wheel-slip control device responsive to a slipping condition of said wheel for effecting operation of said valve member to its brake release position and responsive to cessation of said slipping condition for effecting operation of said valve member to its normal position, and a safety device responsive to a reduction in pressure of fluid at said source to said certain degree to effect closing of said fluid pressure release communication to relief of fluid pressure only as effected by said release valve device, said release valve device comprising a casing containing said valve member which is responsive to fluid pressure in a control chamber in said casing to move to its normal position and to relief of such fluid pressure in said control chamber by way of a passageway in said casing to move to its brake release position, and a valve operable by the wheel-slip control device, in response to a slipping condition of the wheel and cessation of said slipping condition, to effect opening and closing, respectively, of said control chamber to said passageway, and said safety device comprising a valve having one position for opening said passageway to atmosphere and operative to another position for closing said passageway to atmosphere, a snap-acting valve member responsive to pressure of fluid at the source above the certain degree for actuating the last said valve to its said one position, and spring means for operating the last said valve to its said other position, upon reduction of pressure of fluid at said source to said certain degree.

3. In a fluid pressure operable brake control apparatus, the combination comprising a brake application device responsive to pressure of fluid for effecting a brake application to a vehicle wheel and to relief of such fluid pressure for effecting a brake release, a source of supply of fluid under pressure for said brake application device adapted to be normally maintained in excess of a certain degree of pressure adequate for safely braking the vehicle, a release valve device including a valve member having a normal position providing for flow of fluid under pressure from said source to said brake application device and operable to a brake release position providing for relief of fluid pressure from said brake application device through a fluid pressure release communication, a wheel-slip control device responsive to a slipping condition of said wheel for effecting operation of said valve member to its brake release position and responsive to cessation of said slipping condition for effecting operation of said valve means to its normal position, a safety device comprising a piston valve member controlling said fluid pressure release communication and operable in response to pressure of fluid at said source in excess of said certain degree, to a normal position for opening said fluid pressure release communication to atmosphere and operable, upon reduction of pressure of fluid at said source to said certain degree to another position for closing said fluid pressure release communication to atmosphere and for opening a communication bypassing said release valve device whereby fluid under pressure may be supplied from said source to said brake application device independently of said release valve device, and manually operable means for controlling supply and release of fluid under pressure to and from, respectively, said brake application device at all times during operation of the brake apparatus.

4. The combination as defined in claim 3, wherein the safety device further comprises a casing containing and cooperating with the piston valve member to define a first chamber through which fluid under pressure may flow from the source to the release valve device when said piston valve member is in its normal position and a second chamber through which said fluid under pressure may flow from said release valve device to the brake application device when said piston valve member and the valve member of said release valve device are in their respective normal positions and through which second chamber fluid pressure from said brake application device is released to atmosphere by way of said release valve device when said piston valve member is in its normal position and said valve member is in its brake release position, said piston valve member being operable, in response to a reduction of the pressure of fluid at said source to the certain degree, to a by-pass position in which said first and second chambers are closed to the release valve device and a communication by-passing said release valve device is established between said source of fluid under pressure and said brake application device through said second chamber.

5. The combination as defined in claim 3, wherein the safety device comprises a casing, a valve member cooperating with said casing to define a first chamber through which fluid under pressure may flow from the source to the release valve device when said valve member is in a normal position and a second chamber through which said fluid under pressure may flow from said release valve device to the brake application device when said valve member and the valve member of said release valve device are in their respective normal positions and through which second chamber fluid pressure from said brake application device is released to atmosphere when the first said valve member is in its normal position and said release valve device valve member is in its brake release position, and a snap-acting valve member responsive to pressure of fluid at said source in excess of the certain degree for actuating the first said valve member to its normal position, means for actuating the first said valve member, in response to a reduction of pressure of fluid at said source to said certain degree, to a by-pass position in which said first chamber is closed to said source of fluid under pressure and said second chamber is closed to said release valve device and opened to said source of fluid under pressure to establish a communication between said source of fluid under pressure and said brake application device through said second chamber and by-passing said release valve device.

6. In a fluid pressure operable brake control apparatus of the type comprising a brake application device associated with a vehicle wheel and responsive to fluid pressure for effecting a brake application on said wheel and to relief of such pressure for effecting a brake release, a release valve device including means operable to one position for effecting supply of fluid under pressure to said brake application device and to another position for effecting release of fluid pressure from said brake application device through a fluid pressure release communication normally open to atmosphere, and a wheel-slip control device responsive to a slipping condition of said wheel for operating said means to its said other position and to termination of said slipping condition for operating said means to its said one position, the combination of a source of fluid under pressure for said brake application device adapted to be normally maintained in excess of a certain degree of pressure considered adequate for safely braking the vehicle, a safety device responsive to pressure of fluid at said source and operable upon reduction of pressure of fluid at said source to said certain degree to close said fluid pressure release communication to atmosphere independently of said release valve device during such time that the pressure of fluid at said source remains at or below said certain degree, and manually operable means for controlling supply and release of fluid under pressure to and from, respectively, said brake application device at all times during operation of the brake apparatus.

7. In a brake apparatus for a vehicle wheel, in combination, a brake application device operable by fluid under pressure to brake said wheel and in response to release of such fluid under pressure to release the brake on said wheel, a source of fluid under pressure, operator's control means operative to supply fluid under pressure from said source to said brake application device and also operative to release fluid under pressure from said brake application device, release valve means having a normal position opening communication between said operator's control device and said brake application device through which said supply and release of fluid under pressure to and from said brake application device is adapted to be effected by said operator's control device and also having a release position to close said communication and release fluid under pressure from said brake application device, a wheel-slip responsive device responsive to slipping of said wheel to effect movement of said release valve means to said release position and to cessation of said slipping to effect movement of said release valve means to said normal position, and valve means controlling release of fluid under pressure from said brake application device by said release valve means, subject to and operative in response to a chosen reduced pressure in said source to render said release valve means ineffective to release fluid under pressure from said brake application device and to a greater pressure in said source effective to release fluid under pressure from said brake application device.

References Cited in the file of this patent

UNITED STATES PATENTS

| | | |
|---|---|---|
| 2,053,461 | Campbell | Sept. 8, 1936 |
| 2,232,883 | Neveu | Feb. 25, 1941 |
| 2,258,761 | Hewitt | Oct. 14, 1941 |